(12) United States Patent
Choi

(10) Patent No.: US 7,334,761 B2
(45) Date of Patent: Feb. 26, 2008

(54) CLUSTER GAUGE MOUNTING STRUCTURE FOR VEHICLES

(75) Inventor: Jae-Seob Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 97 days.

(21) Appl. No.: 11/202,326

(22) Filed: Aug. 12, 2005

(65) Prior Publication Data

US 2006/0053910 A1 Mar. 16, 2006

(30) Foreign Application Priority Data

Sep. 15, 2004 (KR) .............. 10-2004-0073948

(51) Int. Cl.
G01D 11/30 (2006.01)

(52) U.S. Cl. .................... 248/27.1; 248/904

(58) Field of Classification Search ...... 248/27.1–27.3, 248/904; 73/866.3
See application file for complete search history.

(56) References Cited

U.S. PATENT DOCUMENTS

| | | | | |
|---|---|---|---|---|
| 3,589,656 A | * | 6/1971 | Protzmann | 248/27.1 |
| 4,263,072 A | * | 4/1981 | Bull et al. | 156/73.1 |
| 4,309,012 A | * | 1/1982 | Fukunaga | 248/27.1 |
| 4,368,229 A | * | 1/1983 | Ariga | 248/27.1 X |
| 4,456,640 A | * | 6/1984 | Nishihara | 248/27.1 X |
| 4,948,074 A | * | 8/1990 | Bramhall, Jr. | 248/27.1 |
| 5,067,747 A | * | 11/1991 | Yokoyama | 280/777 |
| 5,324,203 A | * | 6/1994 | Sano et al. | 439/34 |
| 5,578,985 A | * | 11/1996 | Cremers et al. | 73/866.3 X |
| 5,743,767 A | | 4/1998 | Londeck et al. | 439/682 |
| 5,873,749 A | * | 2/1999 | Takiguchi et al. | 439/534 |
| 6,314,810 B1 | | 11/2001 | Kerchaert | 73/431 |
| 6,499,852 B1 | * | 12/2002 | Kino et al. | 362/23 |
| 2003/0056608 A1 | * | 3/2003 | Ishimaru | 73/866.3 |
| 2004/0077197 A1 | * | 4/2004 | Nishide | 439/157 |
| 2005/0146885 A1 | * | 7/2005 | Sumiyoshi | 362/488 |
| 2006/0266890 A1 | * | 11/2006 | Bartrom | 248/27.1 |

FOREIGN PATENT DOCUMENTS

DE 3906216 C1 * 5/1990

* cited by examiner

Primary Examiner—Thomas P. Noland
(74) Attorney, Agent, or Firm—Greenblum & Bernstein, P.L.C.

(57) ABSTRACT

A cluster gauge mounting structure for vehicles includes a hole part of an instrument panel, the instrument panel being connected to a windshield of a vehicle and forming a front inside part of the vehicle, a cluster gauge mounted to an inside of the hole part of the instrument panel that indicates the state of the vehicle, and a supporting device extending inward from the hole part of the instrument panel such that the supporting device is disposed, in a stepped fashion, between the instrument panel and the cluster gauge.

6 Claims, 2 Drawing Sheets

CLUSTER GAUGE MOUNTING STRUCTURE FOR VEHICLES

RELATED APPLICATIONS

The present disclosure relates to subject matter contained in Korean Application No. 10-2004-0073948, filed on Sep. 15, 2004, which is herein expressly incorporated by reference its entirety.

BACKGROUND OF THE INVENTION

1. Field of the Invention

The present invention relates to a structure for mounting a cluster gauge that allows a driver of a vehicle to recognize the state of the vehicle while driving the vehicle, and, more particularly, to a cluster gauge mounting structure wherein a supporting means is formed on an instrument panel of the vehicle, and the cluster gauge is directly mounted to the supporting means of the instrument panel, which does not require provision of an additional mounting member between the instrument panel and the cluster gauge, and thus, the number of fixing points is reduced, whereby assembling efficiency of the cluster gauge is improved, and the number of parts necessary to manufacture the instrument panel is reduced.

2. Description of the Related Art

Generally, an instrument panel is called a gauge board, a dashboard, or a dash panel.

The instrument panel is usually made of a synthetic resin material. To the instrument panel are mounted various gauges and switches as well as an audio system and air conditioner units.

FIG. 1 is a perspective view illustrating a general instrument panel 10 for vehicles.

To the instrument panel 10 are mounted various devices based on the purpose, size, and price of the vehicle. As shown in FIG. 1, the devices usually mounted to the instrument panel 10 include a glove box disposed in front of an assistant driver's seat, a tray unit for accommodating an ash tray and a lighter jack, an air conditioner module, and the like. In front of the driver's seat is disposed a cluster gauge 20 that allows the driver of the vehicle to recognize the state of the vehicle. To the cluster gauge 20 are mounted a gauge for indicating the speed of the vehicle, a gauge for indicating the number of rotations of an engine of the vehicle, a gauge for indicating the engine coolant temperature, a gauge for indicating the temperature in the vehicle, and the like.

FIG. 2 is a sectional view illustrating a conventional cluster gauge mounting structure for vehicles.

Referring to FIG. 2, the conventional cluster gauge mounting structure comprises: an instrument panel 10 connected to a windshield of the vehicle; a cluster gauge 20 mounted in the hole part of the instrument panel 10 for indicating various information such that a driver of the vehicle can recognize the state of the vehicle; and a facia panel 40 disposed between the cluster gauge 20 and the instrument panel 10 for allowing the cluster gauge 20 to be attached to the instrument panel 10.

As shown in FIG. 2, the instrument panel 10 comprises: an outer case 12 forming the external appearance of the instrument panel 10; an inner case 14 forming the inner wall of the instrument panel 10; and a foamed resin 16 filled between the inner case 14 and the outer case 12 for absorbing impact generated when the vehicle collides with another vehicle. The hole part is formed at the instrument panel 10 in front of a steering wheel of the vehicle, and the cluster gauge 20 is mounted in the hole part of the instrument panel 10 for indicating the state of the vehicle so that the driver of the vehicle can easily recognize the state of the vehicle while driving the vehicle.

The cluster gauge 20 comprises: an accommodating part 22 disposed at the inside of the hole part of the instrument panel 10 for accommodating various circuit boards such that the driver of the vehicle can recognize the state of the vehicle; a guide 24 disposed in front of the accommodating part 22, the guide 24 being formed in the shape of a hollow cylinder such that the driver can easily monitor numerical values indicated on the circuit boards disposed in the accommodating part 22; and a glass plate 30 disposed in front of the guide 24.

The facia panel 40 is disposed between the cluster gauge 20 and the instrument panel 10 for allowing the cluster gauge 20 to be mounted in the hole part of the instrument panel 10. Specifically, the facia panel 40 is disposed, in a stepped fashion, between the cluster gauge 20 and the hole part of the instrument panel 10. Consequently, the facia panel 40 forms the rim of the cluster gauge 20. The color of the facia panel 40 may be different from that of the instrument panel 10 to provide an externally pleasing appearance to the instrument panel 10.

In the conventional cluster gauge mounting structure, however, the inner end of the facia panel 40 is attached to the cluster gauge 20, and the outer end of the facia panel 40 is attached to the instrument panel 10. In this way, the facia panel 40 is disposed, in a stepped fashion, between the cluster gauge 20 and the hole part of the instrument panel 10. As a result, the number of parts necessary to manufacture the instrument panel 10 is increased. Also, control in tolerance and dimensions of each component of the cluster gauge mounting structure are very difficult if the facia panel 40 is even slightly deformed. Consequently, assembly efficiency of the cluster gauge is lowered.

Furthermore, the facia panel 40 may be deformed when the vehicle is parked in the hot sun for a long period of time. As a result, the instrument panel 10 may not provide an externally pleasing appearance.

SUMMARY OF THE INVENTION

Therefore, the present invention has been made in view of the above problems, and it is an object of the present invention to provide a cluster gauge mounting structure for vehicles wherein a hole part of an instrument panel is provided with a supporting means, which extends inward, and the cluster gauge is directly attached to the supporting means of the instrument panel, whereby the number of parts necessary to manufacture the instrument panel is reduced, and assembly efficiency of the cluster gauge is improved.

In accordance with the present invention, the above and other objects can be accomplished by the provision of a cluster gauge mounting structure for vehicles, comprising: a hole part of an instrument panel, the instrument panel being connected to a windshield of a vehicle and forming the front inside part of the vehicle; a cluster gauge mounted to an inside of the hole part of the instrument panel for indicating the state of the vehicle; and a supporting means extending inward from the hole part of the instrument panel such that the supporting means is disposed, in a stepped fashion, between the instrument panel and the cluster gauge.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
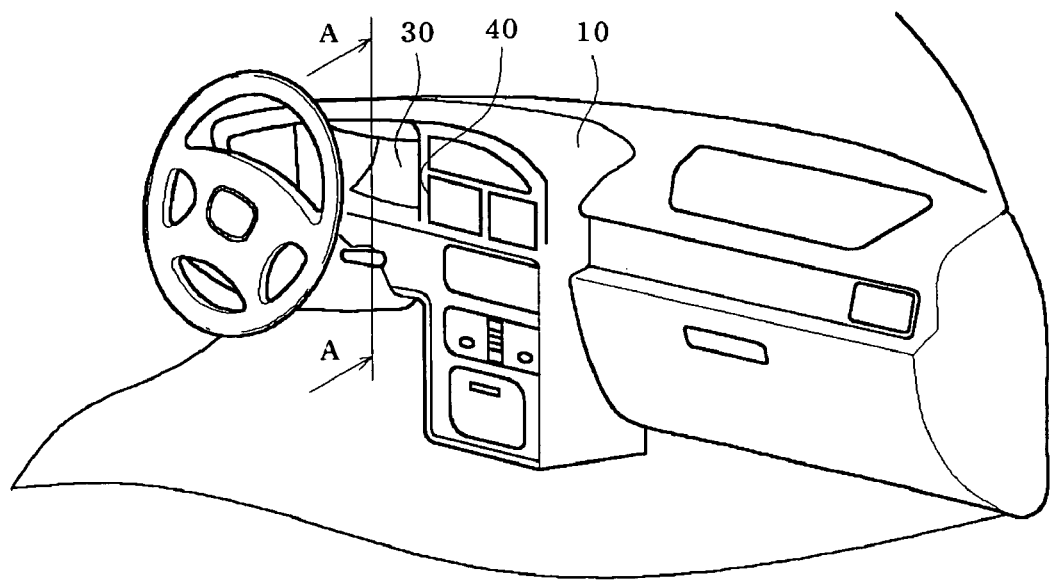
FIG. 1 is a perspective view illustrating a general instrument panel for vehicles.
Figure 2:
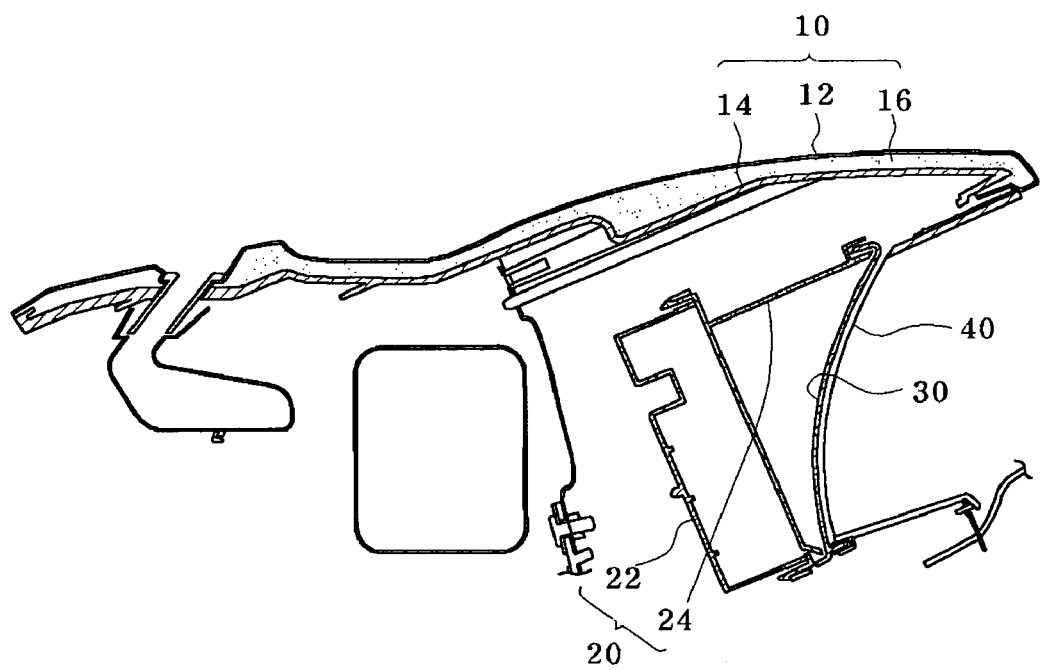
FIG. 2 is a sectional view illustrating a conventional cluster gauge mounting structure for vehicles.
Figure 3:
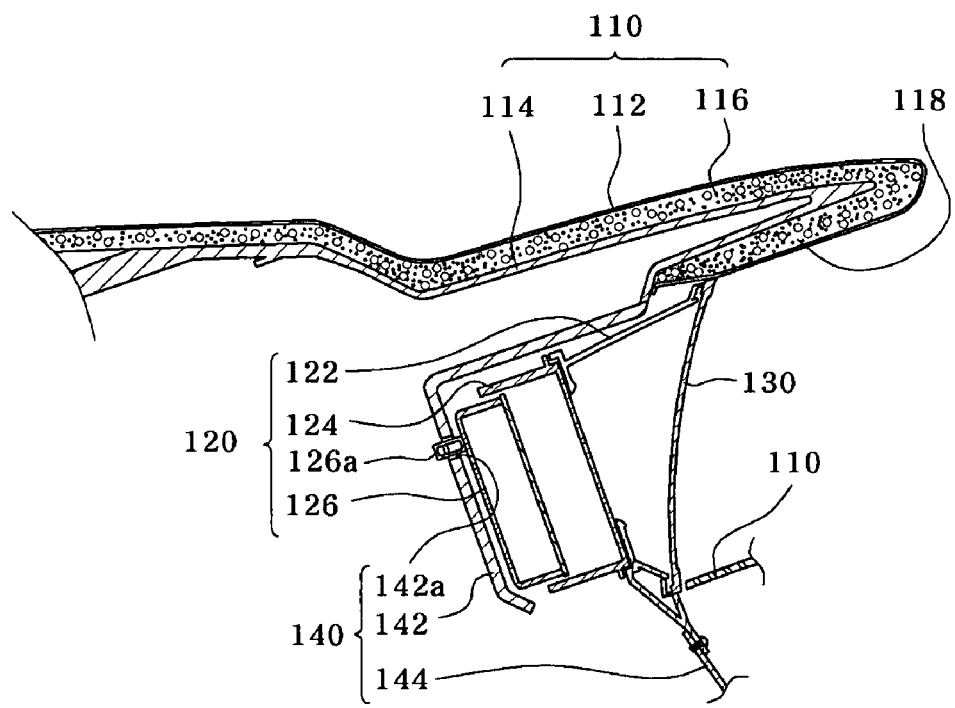
FIG. 3 is a sectional view illustrating a cluster gauge mounting structure for vehicles according to a preferred embodiment of the present invention.
Figure 4:
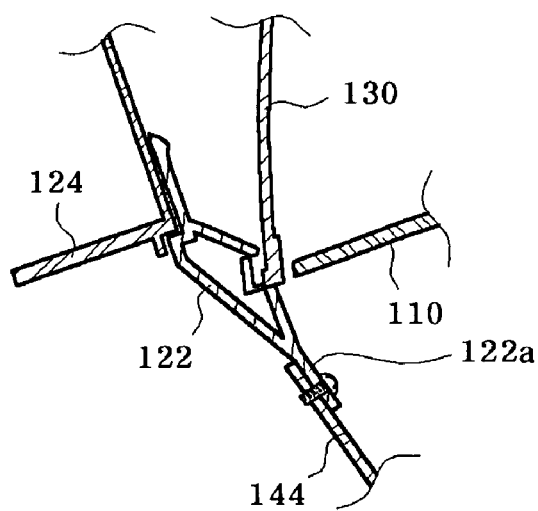
FIG. 4 is a detailed view, in part, illustrating attaching parts and connection parts of the cluster gauge mounting structure for vehicles according to the preferred embodiment of the present invention shown in FIG. 3.

FIG. 3 is a sectional view illustrating a cluster gauge mounting structure for vehicles according to a preferred embodiment of the present invention.

The cluster gauge mounting structure for vehicles comprises: a hole part 118 of an instrument panel 110, the instrument panel 110 being connected to a windshield of a vehicle and forming the front inside part of the vehicle; a cluster gauge 120 mounted in the hole part 118 of the instrument panel 110 for indicating the state of the vehicle; and supporting means 140 extending inward from the hole part 118 of the instrument panel 110 for allowing the cluster gauge 120 to be attached thereto. Consequently, the supporting means 140 is disposed, in a stepped fashion, between the instrument panel 110 and the cluster gauge 120.

As shown in FIG. 3, the instrument panel 110 is configured to absorb impact generated when the vehicle collides with another vehicle. Specifically, the instrument panel 110 comprises: an outer case 112 connected to the windshield of the vehicle, the outer case 112 forming the external appearance of the instrument panel 110; an inner case 114 connected to the inside of the outer case 112, the inner case 114 forming the inner wall of the instrument panel 110; and a foamed resin 116 filled between the outer case 112 and the inner case 114 for absorbing impact generated when the vehicle collides with another vehicle.

The outer case 112 and the inner case 114 are made of a synthetic resin material, which has higher flexibility than a metal material, and the foamed resin 116 is made of a highly impact resistant material, such as Styrofoam. When the vehicle collides with another vehicle, the foamed resin 116 shrinks to absorb the impact. Consequently, damage to the driver is minimized.

The cluster gauge 120 is a gauge that indicates the state of the vehicle during driving the vehicle. Specifically, the cluster gauge 120 indicates the speed of the vehicle, the number of rotations of an engine of the vehicle, the engine coolant temperature, the remaining amount of oil, warning signals, locked state of doors of the vehicle, and the like, to which the driver must pay attention to in order to safely drive the vehicle. As shown in FIG. 3, the cluster gauge 120 comprises: an accommodating part 126 for accommodating a circuit device that receives data indicating the state of the vehicle; a display part 124 disposed in front of the accommodating part 126 for displaying the data received by the circuit device accommodated in the accommodating part 126 in the form of numerical values easily recognizable by the driver; a guide 122 disposed in the front of the display part 124 for allowing the display part 124 and the accommodating part 126 to be mounted in the hole part 118 of the instrument panel 110; and a glass plate 130 disposed in front of the guide 122.

The accommodating part 126 forms the rear surface of the cluster gauge 120. At the rear part of the accommodating part 126 are formed a pair of connection pieces 126a, each of which is a standard clip formed of synthetic resin. The connection pieces 126a are inserted into insertion holes 142a formed at a fixing part 142 of the supporting means 140 such that the cluster gauge 120 is securely located.

At the guide 122 are formed a pair of attaching parts 122a, which protrude downward below the cluster gauge 120. Specifically, the attaching parts 122a are formed, in a pair, at the lower end of the cluster gauge 120. The attaching parts 122a are fixed to the lower rim of the hole part 118 of the instrument panel 110 by means of bolts. In this way, the cluster gauge 120 is attached to the instrument panel 110.

The supporting means 140 is a member extending from the rim of the hole part 118 of the instrument panel 110. The supporting means 140 is integrally formed with the outer case 112, the inner case 114, and the foamed resin 116, which constitute the instrument panel 110. The supporting means 140 extends inward from the hole part 118 of the instrument panel 110.

The supporting means 140 comprises: a fixing part 142 extending inward from the upper end of the hole part 118 of the instrument panel 110 such that the connection pieces 126a of the accommodating part 126 are inserted in the fixing part 142 to securely locate the cluster gauge 120; connection parts 144 formed at the lower end of the hole part 118 of the instrument panel 110 such that the connection parts 144 are connected to the attaching parts 122a formed at the guide 122 by means of bolts, respectively.

The fixing part 142 is bent such that the rear surface of the accommodating part 126 is securely located on the fixing part 142. The fixing part 142 has insertion holes 142a, which correspond to the connection pieces 126a of the accommodating part 126, respectively. When the cluster gauge 120 is inserted into the instrument panel 110 through the hole part 118 of the instrument panel 110, the accommodating part 126 is securely located on the fixing part 142. At this time, the connection pieces 126a of the accommodating part 126 are inserted into the insertion holes 142a of the fixing part 142, respectively. As a result, the cluster gauge 120 is securely located.

Also, the supporting means 140 is inclined upward, as shown in FIG. 3, such that the supporting means 140 is compatible with the cluster gauge 120 disposed while being perpendicular to the line of sight of the driver. Specifically, the upper rim of the hole part 118 of the instrument panel 110 is bent inward; the inner case 114 extends along the upper surface of the cluster gauge 120, and is then bent downward. The connection pieces 126a of the cluster gauge 120 are inserted into the insertion holes 142a of the fixing part 142, respectively, such that the cluster gauge 120 is securely located.

As described above, the connection pieces 126a of the cluster gauge 120 are inserted into the insertion holes 142a of the fixing part 142, respectively, such that the cluster gauge 120 is securely located, and the attaching parts 122a of the guide 122 are connected to the connection parts 144 of the instrument panel 110 by means of bolts, such that the cluster gauge 120 is completely mounted.

As apparent from the above description, the cluster gauge mounting structure for vehicles according to the present invention includes supporting means comprising: a fixing part bent inward from the upper end of a hole part of an instrument panel; and connection parts formed at the lower end of the hole part of the instrument panel for allowing a cluster gauge to be connected thereto, whereby the cluster gauge is easily mounted to the instrument panel. Consequently, the present invention has effects in that the time and cost necessary to mount the instrument panel and the cluster gauge are reduced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A cluster gauge mounting structure for vehicles, comprising:
   a hole part provided in an instrument panel, the instrument panel being connectable to a windshield of a vehicle and forming a front inside part of the vehicle;
   a cluster gauge mounted to an inside of the hole part of the instrument panel that indicates a state of the vehicle; and
   a support extending inward from the hole part of the instrument panel such that the support is disposed, in a stepped fashion, between the instrument panel and the cluster gauge,
   wherein the support includes an inner case extending inwardly along an upper surface of the cluster gauge and bent downwardly to form a fixing part.

2. A cluster gauge mounting structure for vehicles, comprising:
   a hole part of an instrument panel, the instrument panel being connectable to a windshield of a vehicle and forming a front inside part of the vehicle;
   a cluster gauge mounted to an inside of the hole part of the instrument panel that indicates a state of the vehicle; and
   a support extending inward from the hole part of the instrument panel such that the support is disposed, in a stepped fashion, between the instrument panel and the cluster gauge,
   wherein the cluster gauge comprises:
   an accommodating part that accommodates a circuit that receives data indicating the state of the vehicle;
   a display disposed in front of the accommodating part, the display displaying the data received by the circuit such that a driver can recognize the data;
   a guide disposed in the front of the display to allow the instrument panel to be attached to the support; and
   a glass plate disposed in front of the guide.

3. The structure as set forth in claim 2, wherein the accommodating part is provided at the rear thereof with a pair of connection pieces, the connection pieces being inserted in the support.

4. The structure as set forth in claim 2, wherein the guide is provided with a pair of attaching parts, the attaching parts protruding downward from a lower end of the guide such that the attaching parts are connected to the support by bolts.

5. The structure as set forth in, claim 2
   wherein the support comprises:
   a fixing part extending inward from an upper end of the hole part of the instrument panel and bent several times such that the cluster gauge is securely located on the fixing part; and
   connection parts formed at a lower end of the hole part of the instrument panel such that the connection parts are connected to attaching parts formed at the guide by bolts.

6. The structure as set forth in claim 5, wherein the fixing part is formed by bending an upper rim of the hole part of the instrument panel inward and extending an inner case constituting the fixing part more inward along an upper surface of the cluster gauge, an end of the fixing part is bent downward along a rear surface of the cluster gauge, and the fixing part has insertion holes corresponding to the connection parts of the accommodating part, respectively.

* * * * *